Feb. 17, 1959     T. B. REED ET AL     2,874,265
NON-TRANSFERRED ARC TORCH PROCESS AND APPARATUS
Filed May 23, 1956
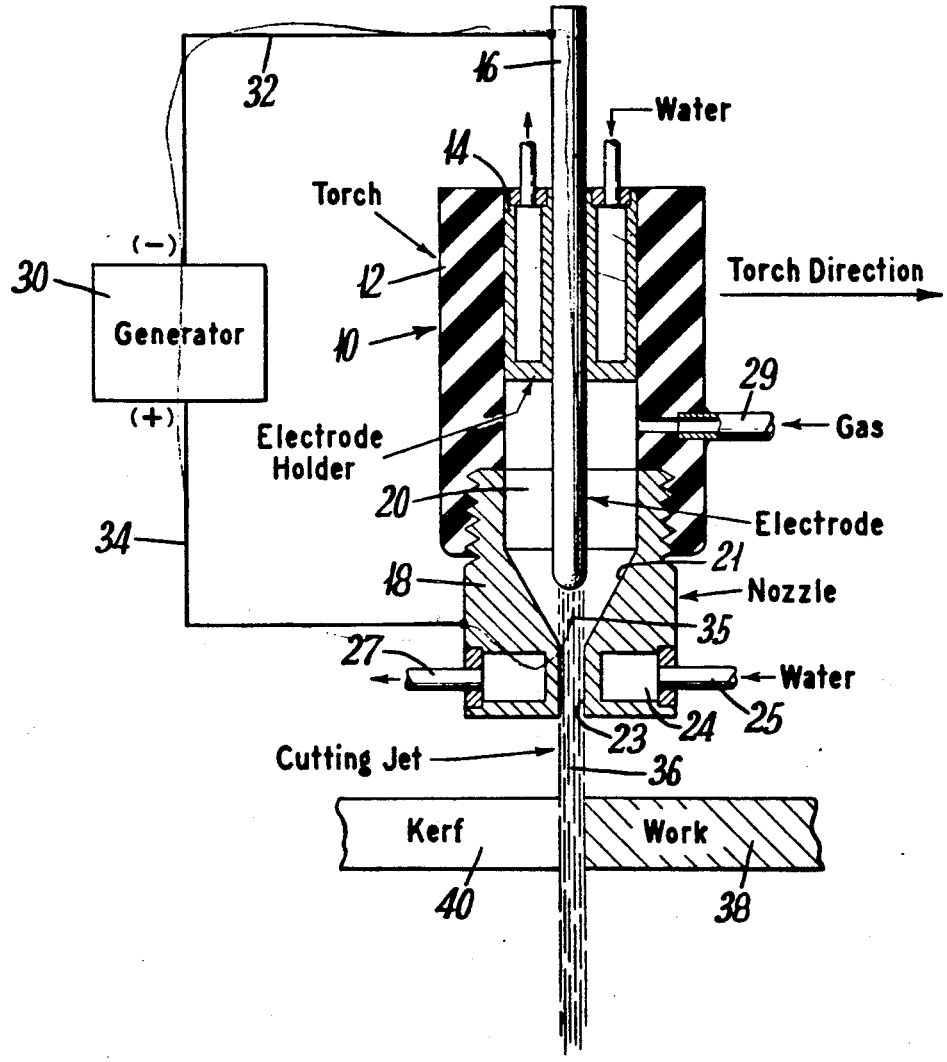
INVENTORS
THOMAS B. REED
JOHN MAIER, III
GLENN W. OYLER
BY Barnwell R. King
ATTORNEY

United States Patent Office 2,874,265
Patented Feb. 17, 1959

2,874,265

NON-TRANSFERRED ARC TORCH PROCESS AND APPARATUS

Thomas B. Reed, Grand Island, N. Y., and John Maier III, Newark, and Glenn W. Oyler, Springfield, N. J., assignors to Union Carbide Corporation, a corporation of New York Application May 23, 1956, Serial No. 586,688

6 Claims. (Cl. 219—121)

This invention relates to constricted arcs of the type disclosed in copending applications Serial No. 524,353, filed July 26, 1955, now Patent No. 2,806,124, dated September 10, 1957, and Serial No. 539,794, filed October 11, 1955, by Robert M. Gage; the present application being a continuation-in-part of our application Serial No. 540,951, filed October 17, 1955.

According to the present invention we provide a major advance in the art which comprises discharging selected gas heated by a constricted arc at a velocity in the sonic range toward a work area. The heat transfer intensity of the resultant effluent from the torch with hydrogen is such that it is possible, for example, cleanly to cut a 0.09 inch kerf (dross-free) at 30 inches per minute in one inch thick aluminum plate not in electrical circuit relation with such arc. Since the work need not be in circuit with the arc the invention is useful also for cutting non-metals, as well as other purposes such as spalling rock.

As used herein the term sonic range includes velocities of 0.5 Mach number or greater. The term "Mach number" refers to the ratio of the linear gas velocity to the velocity of sound in the same gas for the given temperature and gas composition.

More particularly, we provide a novel process of producing a very high temperature, high intensity jet or effluent which comprises delivering hydrogen gas to the inlet of an orifice of a nozzle under pressure, discharging the gas through such orifice at sonic velocity, and maintaining a high pressure arc in such orifice.

An important parameter in industrial heating applications, such as cutting, welding, gouging, piercing or spalling, is the heat transfer intensity of the heat source. As one proceeds, for example, from a Bunsen burner to a blowtorch to an oxy-gas flame to a jet burner, one finds new heating processes possible at each step of increased heat transfer intensity. The flame temperatures of the above devices vary only by a factor of about 2, but the arc flame intensity varies by a factor of about 100, as shown in Table I below. This table also shows that the process of our invention provides a heat source having a heat transfer intensity which is more than 14 times greater than any previously available (jet burner). In particular, this new high intensity obtained with our invention makes it possible to cut thick sections of any common metal or non-metal with a quality and speed comparable and often exceeding that of cutting of steel by the oxy-acetylene process.

The intensity of a flame is determined both by the temperature (or more properly heat content) of the hot gases, and by the rate at which the gases are delivered to the surface being heated (i. e., the flame velocity). Thus: $I$(intensity of effluent)$=V$(velocity)$\times h$(heat content) in cal./cm.$^2$ sec. Such formula will be explained more fully below.

The present invention attains high heat transfer intensity by passing hydrogen gas at sonic velocity or higher through a constricted arc maintained between a central pencil-type electrode and a nozzle electrode.

An essential feature of such arc torch is that it employs a nozzle electrode which is non-consumable and has an orifice through which the torch gas is discharged and into which the arc plasma is forced. The nozzle electrode is so constructed that the maximum effective cross section of the orifice must have an area which is no larger than that which will wall-stabilize the arc. This arc stabilization occurs due to the torch gas stream forcing the arc plasma down into the orifice so as to be adjacent to the orifice walls. The nozzle is cooled so that it will both remain unconsumed and effectively stabilize the arc. Because of its being cold relative to the temperature of the gas passing through it, its length should be limited to not more than about six such minimum diameters or it will rob heat unnecessarily from the effluent.

We have found, however, that one-half to three times the minimum diameter of the orifice provides a satisfactory length thereof. According to our invention, a refractory nozzle metal, such as tungsten, is preferred for longer life of an insert or of the nozzle itself.

Since the arc is carried between electrodes in the torch body, and since the work is not an arc electrode, it is necessary that the energy developed by our torch be transported to the work entirely by the effluent. Because of its unique properties hydrogen gas is preferred by us as the effluent.

The properties of hydrogen which are believed to explain its exceptional utility for our purpose in the arc torch are: (1) for a given current, more heat is put into the gas as the hydrogen content is increased, because the voltage drop across the gas increases with the hydrogen addition; (2) the low molecular weight of hydrogen gives much higher velocities than other common gases to the effluent for a given pressure drop across the nozzle, and the rate of delivery of thermal energy from the arc to the work varies directly with that velocity; and (3) the diatomic hydrogen molecule is dissociated at arc temperatures forming atomic hydrogen which upon recombining gives up large quantities of heat to the work.

Alternative gases that can be used instead of or mixed with hydrogen according to our invention are nitrogen, helium and oxygen as pure gases or compounds and mixtures thereof, such as water and ammonia.

In the drawing the single figure is a diagrammatic view illustrating the invention, the torch and work being shown in cross section.

As shown therein, the torch 10 comprises a cylindrical body 12 containing a water-cooled electrode holder 14 in which is mounted an elongated electrode 16. A metal nozzle 18 is screwed in the end of the body 12. The nozzle has an inner chamber 20 that is provided with a tapered portion 21 leading to an orifice 23 in axial alignment with the electrode 16. The nozzle also is provided with an annular cooling-water passage 24 surrounding the orifice, to which water is delivered and discharged through an inlet 25 and an outlet 27. Gas is

TABLE I

*Estimated flame intensity of heating devices and their uses*

| Device | Temp., °K. | Intensity, kcal./cm.² sec. | Typical Use |
|---|---|---|---|
| Bunsen burner | 1,400 | 0.1 | soft solder. |
| Blowtorch | 1,900 | 0.5 | silver solder. |
| Oxy Flame | 3,000 | 1 | welding. |
| Jet burner | 3,000 | 8 | rock spalling. |
| Non-transferred arc torch using argon gas | 8,000 | 4 | heating. |
| Our invention (with hydrogen) | 8,000 | 114 | metal cutting. | delivered under pressure to the chamber 20 through a pipe 29 in the wall of the torch body 12.

The electrode 16 is connected to one terminal of a suitable source of electrical power, such as a D. C. welding generator 30, by a conductor 32. The other terminal of such generator is connected to the nozzle 18 by a conductor 34. Thus, in this arrangement the electrode 16 is the cathode, and the nozzle 18 is the anode of a high pressure arc 35 which is energized therebetween by the generator 30. Such arc and the gas supplied to the chamber are forced through and discharge from the orifice 23 as a jet 36 of very hot, effluent gas at sonic velocity.

In cutting work 38 with the jet 36, the torch 10 and work 38 are moved relatively one to the other along the desired path of cut, so that the jet rapidly removes material therefrom, forming a kerf 40 in such work.

The construction of the torch wherein the electrodes 16 and 18 are assembled with a closed chamber for the arc gas provides both that the gas passing through the torch 10 can be controlled in its composition, and that by pressurizing the gas in such chamber the velocity of the effluent consisting of jet 36 also can be controlled. This is of greatest importance when it is desired to transport the energy of the jet most rapidly for such uses as the severing of metals.

It has been stated above that the heat transfer intensity of a heat source is determined by the velocity, V, of the gases in the flame and by the heat content, $h$, of the gases (as computed from thermal properties thereof) according to the relationship:

(1) $$I = Vh \text{ in } \frac{cal.}{cm.^2 sec.}$$

This is the energy flux density in the flame itself. It is found in practice that 25–50% of this heat in the flame can be transferred to the object being heated and that this efficiency is independent of velocity.

In order to obtain a high flame intensity, Formula 1 shows that we select a gas possessing simultaneously high V and high $h$. Table II lists the heat transfer intensities for several gases as well as the oxy-acetylene reaction.

The velocity of a flame or effluent is determined by the pressure at which it is discharged through a nozzle and by the molecular weight of the gas. A 15 lb. pressure drop across a nozzle discharging any gas to the atmosphere will produce a jet traveling at the velocity of sound for that gas. The velocity of sound in a gas determines jet velocities. Since the velocity of sound in a gas is proportional to the square root of temperature and inversely proportional to the square root of the molecular weight, it is advantageous to choose a high temperature and a low molecular weight to get the highest V in Formula 1, and this velocity and the product $Vh$ are listed in Table II. This table shows that hydrogen is better by a factor of two than any other gas. In order to get the high velocity shown in Table II, a nozzle cross sectional area is chosen, so that gas volume at arc temp./area=velocity, and generally this will give rather small diameter nozzles (1/16–3/32 inch dia.) with the electrical power available from single commercial power sources. Naturally, if several generators are connected together, greater power is available and larger diameter orifices can be employed.

TABLE II

*Theoretical heat transfer intensity from sonic jets at arc or flame temperatures*

| Gas | Gas Temp.,[1] °K. | Heat Content, cal./cm.³ | Sonic Velocity | | Flame Intensity | |
|---|---|---|---|---|---|---|
| | | | cm./sec. ×10⁴ | ft./sec. | kcal./cm.² sec. | B.t.u., in.² sec. |
| He | 14,200 | .0602 | 6.95 | 22,900 | 41.8 | 1,070 |
| A | 9,000 | .061 | 1.75 | 5,700 | 10.6 | 270 |
| N₂ | 8,000 | .224 | 2.79 | 9,100 | 62.9 | 1,610 |
| O₂ | 8,000 | .152 | 2.61 | 8,500 | 39.6 | 1,030 |
| H₂ | 8,000 | .142 | 10.45 | 34,200 | 149.0 | 3,820 |
| H₂O | 8,000 | .162 | 3.93 | 12,100 | 63.7 | 1,630 |
| 1:1 O₂+C₂H₂ Combustion | 3,300 | .115 | 1.40 | 4,580 | 16.1 | 412 |

[1] Gas temperature in an arc wherein the gas is about 1% ionized. (If additional gas is ionized, these figures will be different, but the same general relationships should hold.)

A practical measure of heat intensity can be obtained using the device herein described. If one subtracts the amount of heat lost in the cooling water from that entering the torch electrically, one obtains the heat transferred to the gas. Dividing this by the nozzle area gives flame intensity. This is listed in several of the examples. The intensities of flames can be measured similarly, knowing fuel consumption and efficiency, and nozzle area and heat loss.

As an example of the use of the principles discussed above, we can mention arc torch cutting. In this process, according to our invention, a non-transferred arc and the resulting jet of gases develop heretofore unknown heat transfer intensities sufficient to melt metals or non-metals in a narrow slit or kerf at a very high rate are made possible. Using the non-transferred torch with a tungsten nozzle, 1-in. thick aluminum plate was cut at 30 I. P. M. and 1-in. stainless steel plate at 6 I. P. M. as per the following Examples I and II.

EXAMPLE I

The non-transferred arc torch comprising a 1/8-in. diameter tungsten electrode setback 1/4-in. from the torch face, and an orifice consisting of water-cooled copper with a tungsten insert about 5/32-in. long with a 0.080-in. diameter axial hole was used with 142 C. F. H. of hydrogen, 15.5 p. s. i. g. chamber pressure at 215 amperes, and 93 volts D. C. between the tungsten cathode and the nozzle, the resulting arc-jet issuing from the nozzle orifice was effective in cutting 1-in. thick aluminum plate at 30 I. P. M., producing a high quality, straight-walled kerf.

EXAMPLE II

The same torch described in Example I above, except that the tungsten nozzle insert was 1/4-in. long and had a 1/16-in. diameter orifice, was used with 100 C. F. H. of hydrogen, chamber pressure 23 p. s. i. g., and 170 amperes, 84 volts, D. C. power, producing a hydrogen jet effluent that was used to cut 1-in. thick stainless steel plate at 6 I. P. M. The cut was very square at the edges and the kerf surfaces were remarkably smooth.

The discussion and examples above show the remarkable ability of the non-transferred arc torch to melt and cut materials when employing hydrogen gas.

The non-transferred arc torch with hydrogen gas also has been used to cut 1/4-inch thick stainless steel plate at 48 inches per minute according to the following example:

EXAMPLE III

The arch torch comprised a ⅛-in. diameter tungsten rod cathode mounted concentric with and set back ⅛-in. from a tungsten anode nozzle ¹⁄₁₆-in. inside diameter by ³⁄₁₆-in. long. The tungsten anode nozzle was made from a ¼-in. diameter round and was press-inserted in the water-cooled copper torch chamber. A supersonic jet effluent of atomic hydrogen was produced by pressurizing the torch chamber with hydrogen was produced by pressurizing the torch chamber with hydrogen gas at 23 p. s. i. gage and heating the gas with a power arc of 170 amperes at 84 volts direct current between the tungsten rod and nozzle electrodes. The hydrogen gas flow through the torch was 100 C. F. H. measured at room temperature and atmospheric pressure. The supersonic atomic hydrogen jet effluent produced a good quality cut through ¼-in. thick stainless steel plate at a speed of 48 inches per minute. The torch-to-plate distance was about ⅛-in. The arc power was 14,300 watts and of this 9,400 was in the gas and the remainder appeared in the cooling water, producing an efficiency of 65%, and an intensity of 114 kcal./cm.² sec.

What is claimed is:

1. Process which comprises energizing a high pressure arc between two electrodes one of which is provided with an orifice, and discharging gas composed of one or more gases selected from the class consisting of hydrogen, nitrogen, helium and oxygen and such arc through such orifice at a velocity in the sonic range thereof, whereby an intense jet-like effluent is produced which flows from such orifice at such velocity, characterized in that such arc is wall-stabilized in such process.

2. Process as defined by claim 1, in which such gas produces at sonic velocity a minimum heat transfer intensity of the order of 40 kcal./cm.² sec, characterized in that such arc is wall-stabilized in such process.

3. Process as defined by claim 2, in which the gas is composed of essentially hydrogen.

4. A sonic jet non-transferred arc torch apparatus comprising, in comibnation, means providing a gas chamber, a nozzle connected to said means, said nozzle having an orifice, the maximum effective cross-sectional area of such orifice being no greater than that of a natural arc at the same current level; an electrode mounted on said means in line with such orifice, means for supplying a selected gas to said chamber for discharge through such orifice at a velocity in the sonic range, and means for energizing a high pressure arc between said electrode and said nozzle, whereby such arc and gas are forced through such orifice, wall-stabilized and discharged therefrom as a jet-like effluent at a velocity in the sonic range thereof.

5. A non-transferred arc torch as defined by claim 4 provided with water-cooled means for discharging through such wall-stabilizing arc constricting orifice a high pressure arc and gas selected to produce an intense jet of effluent at sonic velocity having a heat transfer intensity I of more than the order of 40 when $$I = Vh \text{ (velocity} \times \text{heat content)} \frac{K - \text{calories}}{\text{cm.}^3 \text{ seconds}}$$

6. Process for cutting metals which comprises feeding hydrogen-containing gas around a stick electrode and through a nozzle passage in another electrode, establishing an arc between said stick electrode and said nozzle electrode, projecting said arc into the passage of said nozzle electrode so that it is at least partially well-stabilized thereby, discharging therefrom a jet-like effluent of hot hydrogen gas at a velocity above 0.5 Mach, the shape and cross section of said effluent being controlled by said nozzle electrode, and applying said effluent to a metal body to form therein a narrow (of the order of 0.09 inch wide) dross-free kerf having relatively straight and smooth walls.

References Cited in the file of this patent
UNITED STATES PATENTS

| | | |
|---|---|---|
| 1,002,721 | Mathers | Sept. 5, 1911 |
| 1,746,191 | Devers | Feb. 4, 1930 |
| 1,746,196 | Langmuir et al. | Feb. 4, 1930 |
| 2,768,279 | Rava | Oct. 23, 1956 |